Aug. 19, 1958  J. ROCKOFF ET AL  2,847,865
V-BELTS
Filed Dec. 27, 1952
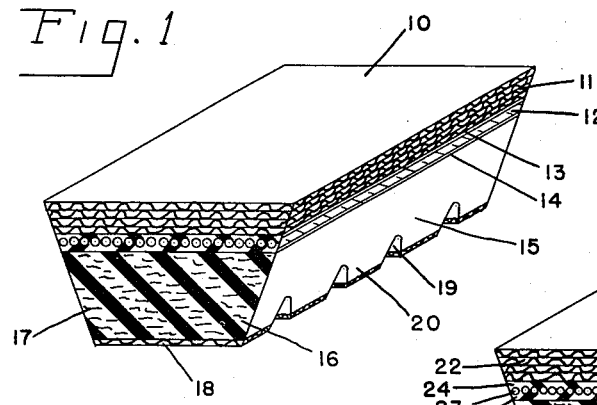
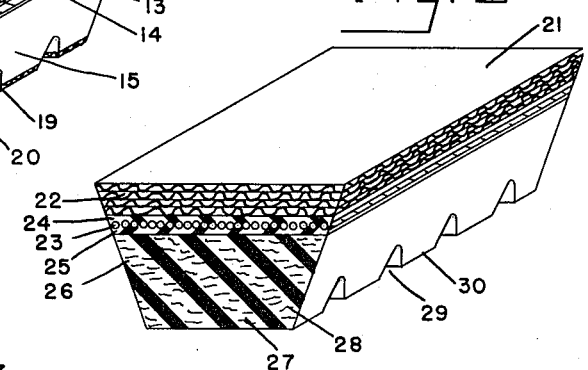
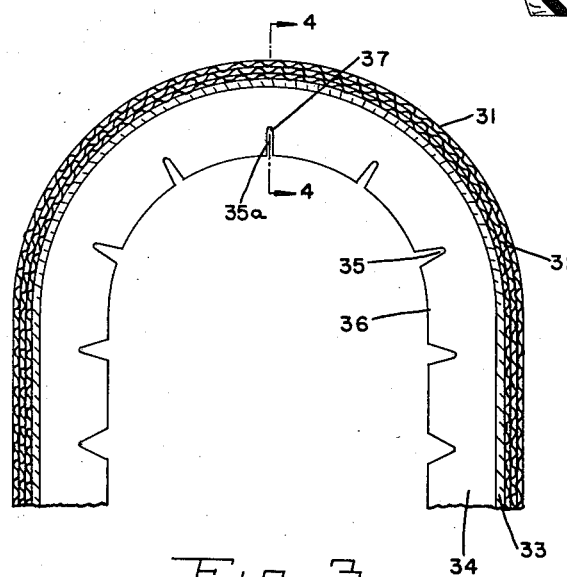
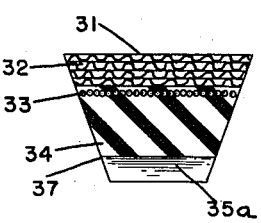
INVENTOR.
J. ROCKOFF
D. L. WAUGH
BY ROBERT S. RADOW
ATT'Y.

United States Patent Office 2,847,865
Patented Aug. 19, 1958

2,847,865

V-BELTS

Joseph Rockoff, Dale L. Waugh, and Robert S. Radow, Dayton, Ohio, assignors to The Dayton Rubber Company, a corporation of Ohio Application December 27, 1952, Serial No. 328,168

3 Claims. (Cl. 74—233)

This invention relates to power transmission belts of the type having a substantially trapezoidal cross section and being commonly referred to as V-belts. This invention comprises in particular a notched V-belt which is characterized by spaced serrations about its inner surface.

Raw edged belts of the type described in Patent No. 1,538,303 to Short and manufactured according to Patent No. 1,591,303 to Freedlander are well known in the V-belt field; and, because of their increased flexibility, resistance to wear, long life and economical manufacture, have become quite prominent. Similarly, ribbed or corrugated belts having spaced transverse lugs or corrugations about their innermost surface as described in Patent No. 1,611,829 to Freedlander, have found widespread use where greater flexibility is desired. Popular acceptance of the corrugated type belt, however, has been somewhat retarded by the additional manufacturing costs involved in providing the corrugations. As a partial solution to this problem, belts have been manufactured according to Patent No. 2,025,278 to Freedlander, wherein is described the process of building and vulcanizing a plain base or uncorrugated belt and thereafter subjecting the same to a cutting machine which operates to serrate the narrow innermost belt surface.

Because of the savings in the cost of manufacturing serrated belts according to the method in the last described Freedlander patent, and because of the economy of manufacturing and operating the previously described raw edged belts, it has been desired to apply the serrating method to the raw edged belts in order to obtain a belt of great durability and flexibility at a relatively inexpensive manufacturing cost. While the above described serrating method has proved satisfactory in the manufacture of wrapped or covered belts composed of successive layers of rubberized fabric, its application to the making of raw edged belts, and particularly to the making of raw edged belts having an inner portion of rubber composition in which the serrations are made, has not been completely successful. One of the principal reasons for this lack of success has been the inability to prevent tears or radial cracks from the lines of serration which occur at early stages in the operation of the belt and thereby drastically reduce its useful life. Another problem arising from the serrating method has been the difficulty of obtaining notches that are uniform as to width, depth and contour. This problem has been especially pronounced with regard to raw edged belts, in which no covering material is provided to support the belt as it is being serrated.

In all types of belting, the heat resulting from the internal stresses accompanying the constant flexing during operation has resulted in deterioration of the belting material, undesirable changes in the driving surfaces and premature failure of the belt.

It is therefore an object of the present invention to provide a notched or serrated belt which is both extremely flexible and wear resistant.

It is another object of this invention to provide a notched belt which will not develop tears or cracks from the lines of serration.

It is a further object of this invention to provide a notched belt having an inner compression section of rubber-like composition which is cut so as to form uniform V-shaped notches about its inner periphery.

It is still another object of this invention to provide a belt which will create a minimum of heat during operation and at the same time will be relatively unaffected by any heat to which it is subjected.

To achieve these and other objects and advantages of the invention which will be apparent from the following disclosure, it is proposed to construct a V-belt having an outer tension section composed of an extensible material so that it may stretch when the belt flexes about a pulley, an intermediate neutral axis section composed of an inextensible but flexible material and an inner compression section of synthetic rubber and textile fiber composition which may be cut to provide longitudinally spaced lugs or ribs which will not tear away from the main body of the belt or cause cracking thereof. In the present belt so constructed, no fabric cover need be applied to the outer surfaces so that the material of the enumerated sections will lie in and form the side driving surfaces of the belt. The basic material of said compression section is a rubber-like composition interspersed with which is a limited amount of finely ground textile fibers in the approximate weight ratio of from 5 to 20 parts of fiber to 100 parts of the rubber-like material. This ratio of fiber to rubber composition is considerably less than that commonly used in fiber-loaded rubber compositions which are used to form the compression section of V-belts generally.

As a result of the reduced amount of textile fiber in the rubber material, those fibers that are in the composition are subjected to a proportionately greater share of the effect of milling and preparation of the stock, so that they become more finely ground or broken up than in the higher fiber content compounds. Along with being more finely ground, these fibers are at the same time more evenly distributed throughout the composition; and it is this combination of finely ground fibers evenly distributed throughout the rubber composition that enables us to serrate the compression section of the presently proposed belt without creating a tendency for the formation of tears or cracks about the lines of serration. These desired results flow from the fact that the evenly distributed finely ground fibers provide a uniform reinforcement as well as uniform flexibility in the compression section so that there are no undesirable stress concentrations as the belt flexes such as might lead to cracking and tearing.

It has also been discovered that tearing and cracking tendences will be further reduced if the synthetic rubber composition in the compression section comprises a chloroprene polymer identified by the formula chlor-2-butadiene-1,3 as disclosed in Patent No. 2,402,837 and commonly referred to as neoprene or GR–M. This polymer has particular adaptability to notched belts in that, unlike natural rubber and the other synthetic rubber-like polymers, it does not become tacky as its operating temperatures rise. Because of this fact, the belt will have a certain amount of slip as it enters and leaves the pulley so that stresses tending to open up the notches and to form radial cracking from the apexes thereof will be substantially eliminated.

Having thus established a belt that will be substantially free from tearing or cracking, one may provide the inner surface of the same with notches or serrations that are V-shaped as opposed to rectangular, circular and similar contours that have been previously employed in belting. These notches are to be made after the belt has been finally vulcanized. While the use of the rectangular serrations provided block-like teeth that were likely to break and be torn away from the body of the belt, and the circular notches closed at their outer edges first, leaving a tear shaped opening which, upon further closure of the notch, caused a side bulging at the top or trough of the notch which in turn led to uneven wear on the side driving surfaces of the belt at the point where such bulging took place, the V-shaped notch closes evenly and smoothly leaving at most a radial slit upon complete closure of the notch which does not disrupt the sides or body of the belt. Furthermore, the V-shaped notch allows a greater closing area about the inner surface of the belt for a given amount of belt material cut away than does any other notched contour, so that the greatest flexibility may be obtained with the least amount of belt material removed and the least weakening of the belt thereby.

Since the notching of the belt takes place after the final vulcanization, the removal of the belting material alleviates any internal stresses that have arisen in the belt during the building or vulcanizing stages of manufacture. Because the internal stresses present in the belt while it is in repose are thus substantially eliminated and because the removal of the belting material in the notching process results in there being less resistance to flexure during operation, a belt according to this invention will flex in operation with a minimum of internal stress and heat resulting therefrom. As previously explained the neoprene or GR-M composition of the present belt has been found to be relatively unaffected either as to deterioration or change in the surface properties of the belting material by increases in temperature. Thus, a belt according to the present invention will operate at lower temperatures while at the same time being relatively unaffected by any temperature changes, all to the desirable end that the usual deleterious effect of operational heat on belt life is eliminated.

Proceeding now to the appended drawing, and the following detailed description related thereto:

Figure 1 is a vertically sectioned view in perspective of a belt embodying the features of this invention.

Figure 2 is a perspective view of a modified belt constructed according to this invention.

Figure 3 is an elevational view of a flexed belt having V-shaped notches about its inner surface according to the present invention.

Figure 4 is a vertical transverse section on line 4—4 of Figure 3.

Belt 10 of Figure 1 comprises a tension section 11 of a plurality of superimposed layers of rubberized bias cut textile fabric, a neutral axis section 12 of continuously wound inextensible cord embedded between thin layers 13 and 14 of rubber or rubber-like composition, and a compression section 15 which is composed of rubber or rubber-like material 16 which is loaded with finely ground textile fibers 17 and underlying which is a base strip of rubberized bias cut fabric 18. As illustrated, the inner surface of the belt is provided with a plurality of spaced transverse substantially V-shaped serrations 19 which form substantially trapezoidal lugs or transverse ribs 20.

Depending upon the diameter of the pulleys over which the belt will be operated and the amount of load to be carried, the pitch or longitudinal spacing of the notches may range from ¼" to ¾". The included angle between the converging faces of the notch may be from 10 to 30 degrees and the notch depth should be less than ⅔ of the thickness of the compression section. The maximum limitations as to the depth and included angle of the notch have been determined by tests which have disclosed that ribs formed by notches that are too deep or too wide will have a tendency to break or tear away from the main body of the belt. It has been determined further that notches having sides converging at an angle of less than 10 degrees do not materially alter the flexibility of the belt and the additional operation necessary for their provision is accordingly unjustified; while notches having sides converging at an angle of more than 30 degrees tend to weaken the belt. These ranges notwithstanding, it is to be understood that in a particular belt, the notches should be uniformly constructed and arranged so that the belt will flex the same at all points and bending stresses will not be excessive in any one place.

As previously explained, the weight ratio of fibers 17 to rubber-like material 16 should be within the limits of from 5 to 20 parts of the fiber to 100 parts of the rubber, so that the former may be finely ground and uniformly distributed. These fibers should be so cracked that, after they are mixed in the rubber-like composition, they will range in length from ¹⁄₁₆" to ¼". One preferred composition for the compression section of this belt consists of the following parts by weight:

| | Parts by weight |
|---|---|
| Polychloroprene | 100 |
| Zinc oxide | 2 |
| Anti-oxidant | 2 |
| Accelerator | .75 |
| High abrasion furnace black | 45 |
| Calcined magnesium oxide | 4 |
| Sodium acetate | 1 |
| Stearic acid | 1.5 |
| Medium process oil | 2.5 |
| Plasticizer | 10 |
| Cracked rag (cotton fibers) | 12.5 |

This composition, including the cracked rag, should have a Mooney viscosity in the range of 55 to 65 before vulcanization and should cure for 60 minutes at 287° F. to a Shore A hardness in the range of 70 to 80.

The belt 21 of Figure 2 is similar to that shown in Figure 1 and has a similar tension section 22 of rubberized fabric layers, neutral axis section 23 of strength cord, upper and lower rubber-like cushion layers 24 and 25 respectively, and the compression section 26 of a rubber-like material 27 and finely cracked or ground textile fibers 28, said compression section being provided with longitudinally spaced and transversely extending V-shaped notches 29 forming transversely extending trapezoidal lugs 30. The absence of the base fabric 18 of the belt of Figure 1 in this modification illustrates that uniform V-shaped notches may be cut in the compression section of this invention even though the same be unsupported by any fabric whatsoever. The elimination of this base fabric, in addition to reducing the manufacturing costs for the belt of this invention, further reduced resistance to flexure and eliminates one of the causes of belt squeak. The operating advantages of the belt having an inner surface provided with a plurality of upwardly extending V-shaped notches, such as is made possible by construction herein disclosed, are illustrated in Figures 3 and 4. Here the belt 31 consists of a tension section 32, neutral axis section 33 and notched compression section 34 according to the above described principles. Referring in particular to Figure 3, there is shown the manner in which the V-shaped notches 35 close upon flexure of the belt. It should be noted that at the notch where the flexure is greatest such as at 35a, the closure of such notch approaches a radial slit leaving a substantially continuous and unbroken side driving surface in contact with the sidewalls of pulley grooves, thereby increasing the potential effective pull which the belt can exert before slipping on the pulley. In addition to thus increasing the effective side driving area of contact between belt and pulley, the V-shaped notches 35 form trapezoidal lugs 36 having their larger base adjacent to the continuous upper portion of the belt, so that the tendency of these lugs to tear away from the main body of the belt is substantially reduced.

A further advantage of the V-shaped notch of this invention resides in the manner in which it closes without any side bulging such as occurs where circular or block type notches, such as have been previously used are employed. In Figure 4 it can be seen that the converging sides of the belt, even at the point of greatest flexure on the line 4—4 of Figure 3 are straight and uninterrupted by lateral bulging such as normally occurs at the apex 37 of the closed notch.

In the manufacture of belts of the type disclosed herein, a sheet of synthetic rubber and textile fiber compression stock, preferably of the neoprene variety, is wound about a suitable mandrel and spliced thereon. As previously disclosed, a layer of rubberized base fabric may or may not be employed in the belt; but, if the same is to be used, it should be wound about the mandrel prior to the application of the compression stock. About the compression stock, the lower cushion layer, the neutral axis cord, the upper cushion layer and the tension fabric layers are respectively wound and the sleeve thus formed is placed under pressure by wrapping or other compacting means and vulcanized in an open steam autoclave, hot air oven, water curing apparatus, or the like. From the vulcanized rubber and fabric sleeve thus formed, individual endless belts may be formed by cutting circumferentially thereof. It is preferred that the individual belts thus formed be inverted, that is, turned through 180 degrees so that the narrow compression side is toward the outside of the belt and is under slight tension and that the transverse notches be formed by cutting or grinding from the belt so positioned.

Throughout this disclosure, reference to V-shaped notches is meant to include any substantially V-shaped notch such as might be more particularly defined as a notch having substantially straight and convergent sides. To obtain greatest resistance to radial cracking, it is preferred that the trough or apex of the notch be slightly rounded so that the stresses resulting from belt flexure will not be concentrated at any one point upon the notch. Similarly, while the examples and illustrations herein have referred to raw edge belts, the principles of this invention are equally applicable where the outer surface of the belt is provided with a fabric wrapper or cover. It is to be further understood that reference to other specific examples and embodiments herein is for purposes of description only and does not limit the scope of the present invention as more particularly defined in the subjoined claims.

We claim:

1. As an article of manufacture, a flexible V-belt comprising an inner compression section of synthetic rubber and finely ground textile fibers from $\frac{1}{16}$ in. to $\frac{1}{4}$ in. in length in the ratio of 5 to 20 parts by weight of textile fibers to 100 parts by weight of synthetic rubber, an intermediate neutral axis section of circumferentially wound inextensible cord and an outer tension section of superimposed strips of rubberized fabric in which the material of said sections is exposed along the sides thereof and forms the side driving surfaces of said belt and in which said compression section has a plurality of longitudinally spaced transverse V-shaped notches extending upwardly from its inner surface, the said inner surface consisting entirely of the exposed material of said compression section.

2. As an article of manufacture a notched laminated power transmission belt of trapezoidal cross-section comprising a relatively inextensible neutral axis section and an inwardly disposed compression section having a plurality of longitudinally spaced V-shaped notches extending upwardly from its inner surface to enhance the flexibility of the belt, said compression section consisting of a rubber-like composition having dispersed therein from 5 to 20 parts by weight of textile fibers, from $\frac{1}{16}$ in. to $\frac{1}{4}$ in. in length, to 100 parts by weight of the rubber-like composition whereby said fibers retard the cracking of the belt at the peak of said notches, said rubber-like composition being exposed to the edges of the belt and to the inner surface thereof at least along the inner surface of said notches.

3. A belt according to claim 2 wherein the depth of said notches does not exceed two-thirds of the thickness of said compression section.

References Cited in the file of this patent

UNITED STATES PATENTS

| | | |
|---|---|---|
| 2,016,140 | Freedlander | Oct. 1, 1935 |
| 2,113,561 | Freedlander | Apr. 12, 1938 |
| 2,532,184 | Nassimbene | Nov. 28, 1950 |
| 2,620,016 | Adams | Dec. 2, 1952 |
| 2,655,195 | Curtis | Oct. 13, 1953 |